US010331455B2

(12) United States Patent
Lee et al.

(10) Patent No.: US 10,331,455 B2
(45) Date of Patent: Jun. 25, 2019

(54) ELECTRONIC APPARATUS, VLIW PROCESSOR AND CONTROL METHODS FOR UPDATING A MULTI-CYCLE NO OPERATION (NOP) INSTRUCTION

(71) Applicant: Samsung Electronics Co., Ltd., Gyeonggi-do (KR)

(72) Inventors: Jong-hun Lee, Seoul (KR); Jae-un Park, Seoul (KR); Si-hoon Song, Seoul (KR); Myung-sun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 155 days.

(21) Appl. No.: 15/654,277

(22) Filed: Jul. 19, 2017

(65) Prior Publication Data

US 2018/0081692 A1   Mar. 22, 2018

(30) Foreign Application Priority Data

Sep. 19, 2016 (KR) .................. 10-2016-0119489

(51) Int. Cl.
*G06F 9/38* (2018.01)
*G06F 9/30* (2018.01)
(Continued)

(52) U.S. Cl.
CPC ............ *G06F 9/3853* (2013.01); *G06F 8/41* (2013.01); *G06F 9/30072* (2013.01);
(Continued)

(58) Field of Classification Search
CPC ...... G06F 9/3853; G06F 9/30079; G06F 8/41; G06F 9/30072; G06F 9/30152; G06F 15/82
(Continued)

(56) References Cited

U.S. PATENT DOCUMENTS

| 5,021,985 A | 6/1991 | Hu et al. |
| 5,958,044 A * | 9/1999 | Brown ................ G06F 9/30079 712/215 |

(Continued)

FOREIGN PATENT DOCUMENTS

| KR | 1019970053069 | 10/1997 |
| KR | 1019990032104 | 5/1999 |

(Continued)

OTHER PUBLICATIONS

International Search Report dated Dec. 28, 2017 issued in counterpart application No. PCT/KR2017/009800, 10 pages.

(Continued)

*Primary Examiner* — Aimee Li
*Assistant Examiner* — Shawn Doman
(74) *Attorney, Agent, or Firm* — The Farrell Law Firm, P.C.

(57) ABSTRACT

An electronic apparatus generating compiled data used in a very long instruction word (VLIW) processor including a plurality of function units is provided. The electronic apparatus includes a storage and a processor configured to control the storage to store the compiled data in which a plurality of VLIW instructions are compiled, identify a VLIW instruction from the compiled data; and update, if a multi-cycle no operation (nop) instruction for the plurality of function units is identified within a cycle corresponding to a latency of the identified VLIW instruction and if an end cycle of another VLIW instruction is within the cycle corresponding to the latency of the identified VLIW instruction, the compiled data by including information on a cycle difference between an end cycle of the identified VLIW instruction and the end cycle of the another VLIW instruction in the multi-cycle nop instruction.

16 Claims, 14 Drawing Sheets

(51) Int. Cl.
*G06F 15/82* (2006.01)
*G06F 8/41* (2018.01)

(52) U.S. Cl.
CPC ...... *G06F 9/30079* (2013.01); *G06F 9/30152* (2013.01); *G06F 15/82* (2013.01)

(58) Field of Classification Search
USPC .......................................................... 712/24
See application file for complete search history.

(56) References Cited

U.S. PATENT DOCUMENTS

| | | | |
|---|---|---|---|
| 5,961,630 A | 10/1999 | Zaidi et al. | |
| 6,044,450 A | 3/2000 | Tsushima et al. | |
| 6,275,929 B1* | 8/2001 | Blum | G06F 9/30145 |
| | | | 712/219 |
| 6,487,575 B1 | 11/2002 | Oberman | |
| 6,799,266 B1 | 9/2004 | Stotzer et al. | |
| 7,284,117 B1 | 10/2007 | Radhakrishnan et al. | |
| 7,430,654 B2 | 9/2008 | Huang et al. | |
| 8,578,196 B2* | 11/2013 | Barowski | G06F 1/3203 |
| | | | 713/324 |
| 9,804,853 B2 | 10/2017 | Park et al. | |
| 2005/0257028 A1 | 11/2005 | Guffens et al. | |
| 2006/0242387 A1 | 10/2006 | Helshi et al. | |
| 2008/0235492 A1* | 9/2008 | Baek | G06F 9/30156 |
| | | | 712/24 |
| 2011/0202749 A1* | 8/2011 | Jin | G06F 9/3017 |
| | | | 712/226 |
| 2014/0317383 A1 | 10/2014 | Park et al. | |

FOREIGN PATENT DOCUMENTS

| | | |
|---|---|---|
| KR | 1020140126191 | 10/2014 |
| WO | WO 2005/022379 | 3/2005 |

OTHER PUBLICATIONS

A.F. de Souza, et al. "Dynamically Scheduling VLIW Instructions", Journal of Parallel and Distributed Computing 60, pp. 1480-1511 (2000).

* cited by examiner

FIG. 5B

|   | FU0 | FU1 | FU2 | FU3 |
|---|-----|-----|-----|-----|
| 1 | add | ld  | -   | -   |
| 2 | set |     | -   | -   |
| 3 | st  |     | mul | mul |
| 4 | nop | nop | nop | nop |
| 5 | -   |     |     |     |
| 6 | -   | -   |     |     |
| 7 | -   | -   |     |     |
| 8 | add | -   |     |     |
| 9 | -   | -   | lsr | lsr |

530

ELECTRONIC APPARATUS, VLIW PROCESSOR AND CONTROL METHODS FOR UPDATING A MULTI-CYCLE NO OPERATION (NOP) INSTRUCTION

PRIORITY

This application claims priority under 35 U.S.C. § 119(a) to Korean Patent Application Ser. No. 10-2016-0119489, which was filed in the Korean Intellectual Property Office on Sep. 19, 2016, the entire content of which is incorporated herein by reference.

BACKGROUND

1. Field of the Disclosure

The present disclosure relates, generally, to an electronic apparatus including a reconfigurable very long instruction word (VLIW) processor that is configured to process a VLIW instruction.

2. Description of the Related Art

As instruction per cycle (IPC) of reduced instruction set computers (RISC) becomes more and more limited, studies have been started to increase performance of a processor by increasing instruction level parrallism (ILP), and as a result, processors such as a VLIW processor, a superscalar processor, an explicitly parallel instruction computing (EPIC) processor, and the like have been developed. In order to increase the ILP, a scheduling technology of determining the order and point of time of instructions is required, where a compiler plays an important role. In particular, with respect to the VLIW, various scheduling techniques in which the compiler maximizes the ILP based on data dependency, register pressure analysis, and the like have been studied.

With respect to the VLIW, the compiler analyzes the data dependency to designate an order of instructions, an execution function unit, and an issue point of time. Conversely, with respect to the superscalar processor, the processor analyzes a relationship between created instructions to designate the execution function unit and the issue point of time.

With respect to the superscalar processor, a point of time at which an operation of one instruction is completed is predefined, and an operation of a next instruction starts after a point of time at which an operation of a previous instruction is completed. Since a multiplying (mul) instruction, a division (div) instruction, and the like have a very long latency, continuous no operational (nop) instructions or stall instructions are added to wait a result of the operation.

However, in applications that process a large amount of information, e.g., signal processing, a computer vision, a big data analysis, and the like, only a very small portion of an input data may have a valid value, and a significant portion of the input data may have an invalid value.

SUMMARY

The present disclosure has been made to address at least the disadvantages described above and to provide at least the advantages described below.

An aspect of the present disclosure provides an electronic apparatus for rapidly processing compiled data in which a VLIW instruction is compiled.

In accordance with an aspect of the present disclosure, there is provided an electronic apparatus which generates compiled data used in a very long instruction word (VLIW) processor including a plurality of function units. The electronic apparatus includes a storage; and a processor configured to control the storage to store the compiled data in which a plurality of VLIW instructions are compiled, identify a VLIW instruction from the compiled data; and update, if a multi-cycle no operation (nop) instruction for the plurality of function units is identified within a cycle corresponding to a latency of the identified VLIW instruction and if an end cycle of another VLIW instruction is within the cycle corresponding to the latency of the identified VLIW instruction, the compiled data by including information on a cycle difference between an end cycle of the identified VLIW instruction and the end cycle of the another VLIW instruction in the multi-cycle nop instruction.

In accordance with an aspect of the present disclosure, there is provided a very long instruction word (VLIW) processor. The VLIW processor a memory; and a plurality of function units, wherein the VLIW processor configured to control the memory to store compiled data, control the plurality of function units to process the compiled data, sequentially execute at least one VLIW instruction based on the compiled data and shorten, if the at least one VLIW instruction being executed is a predetermined instruction, if an operand of the at least one VLIW instruction comprises a predetermined value, and if a multi-cycle no operation (nop) instruction synchronized with the at least one VLIW instruction is identified within a cycle corresponding to a latency of the at least one VLIW instruction, a cycle of the multi-cycle nop instruction based on information included in the multi-cycle nop instruction.

In accordance with an aspect of the present disclosure, there is provided a very long instruction word (VLIW) processor. The VLIW processor includes a memory; and a plurality of function units, wherein the VLIW processor configured to control the memory to store compiled data, control the plurality of function units to process the compiled data, sequentially execute at least one VLIW instruction based on the compiled data, change a latency of the at least one VLIW instruction, if the at least one VLIW instruction being executed is a predetermined VLIW instruction and an operand of the at least one VLIW instruction has a predetermined value, and process the at least one VLIW instruction during the changed latency.

In accordance with an aspect of the present disclosure, there is provided a control method of an electronic apparatus that generates compiled data used in a very long instruction word (VLIW) processor including a plurality of function units. The control method includes identifying a VLIW instruction in compiled data in which a plurality of VLIW instructions are compiled and updating, if a multi-cycle no operation (nop) instruction for the plurality of function units is identified within a cycle corresponding to a latency of the identified VLIW instruction and an end cycle of another VLIW instruction is within the cycle corresponding to the latency of the identified VLIW instruction, the compiled data by including information on a cycle difference between an end cycle of the identified VLIW instruction and the end cycle of the another VLIW instruction in the multi-cycle nop instruction.

In accordance with an aspect of the present disclosure, there is provided a control method of a very long instruction word (VLIW) processor. The method includes sequentially executing at least one VLIW instruction based on compiled data and shortening, if the at least one VLIW instruction being executed is a predetermined VLIW instruction, if an operand of the at least one VLIW instruction comprises a predetermined value, and if a multi-cycle no operation (nop) instruction synchronized with the at least one VLIW instruction is identified within a cycle corresponding to a latency of the at least one VLIW instruction, a cycle of the multi-cycle nop instruction based on information included in the multi-cycle nop instruction to process the compiled data using a plurality of function units.

In accordance with an aspect of the present disclosure, there is provided a control method of a very long instruction word (VLIW) processor. The control method includes sequentially executing at least one VLIW instruction based on compiled data, changing a latency of the at least one VLIW instruction, if the at least one VLIW instruction being executed is a predetermined VLIW instruction and an operand of the at least one VLIW instruction comprises a predetermined value, and processing the at least one VLIW instruction during the changed latency.

According to the diverse exemplary embodiments of the present disclosure, the VLIW processor may improve data processing speed by shortening some cycles of the compiled data in which the VLIW instruction is compiled to process the compiled data.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIGS. 5A to 5C are diagrams of a method for shortening cycles that include a plurality of function units, according to an embodiment of the present disclosure;

DETAILED DESCRIPTION

Figure 1:
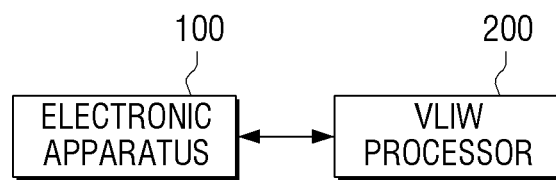
FIG. 1 is a diagram of an electronic apparatus and a VLIW processor, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

Hereinafter, various exemplary embodiment of the present disclosure will be described in detail with reference to the accompanying drawings.

FIG. 1 is a diagram of an electronic apparatus 100 and a VLIW processor 200, according to an embodiment of the present disclosure.

The electronic apparatus 100 may perform a compiling operation that converts a program written in a high-level language into a language that may be directly understood by the VLIW processor 200, so that the VLIW processor 200 can process the converted program.

The electronic apparatus 100 may extract a plurality of VLIW instructions from the program written in the high-level language, and compile the plurality of extracted VLIW instructions to generate compiled data. The VLIW instructions may be instructions processed by the plurality of function units included in the VLIW processor 200.

The electronic apparatus 100 may determine whether there is a shortening possibility of some cycles in the compiled data, and if there is a shortening possibility of some cycles, the electronic apparatus 100 may include corresponding information in the compiled data.

The electronic apparatus 100 may determine whether there is a shortening possibility of some cycles after it directly generates the compiled data. The electronic apparatus 100 may receive pre-compiled data to determine whether there is a shortening possibility of some cycles.

The electronic apparatus 100 may transmit the generated compiled data to the VLIW processor 200. However, the compiled data may also be indirectly transmitted to the VLIW processor 200, via one or more other modules of the electronic apparatus 100.

The VLIW processor 200 may receive the compiled data from the electronic apparatus 100 and process the received compiled data (e.g., VLIW instruction for each of the cycles based on the compiled data) using the plurality of function units included in the VLIW processor 200.

In addition, the plurality of function units included in the VLIW processor 200 may be different from each other. For example, a first function unit in the VLIW processor 200 may perform only an add operation, but a second function unit may also perform a multiplying operation as well as the add operation. However, all of the plurality of function units included in the VLIW processor 200 may also be the same as each other.

For illustrative purposes, the VLIW processor 200 is described herein including four function units, but more or less function units can be used.

If information on the cycle having the shortening possibility is included in the compiled data, the VLIW processor 200 may determine whether the corresponding cycle may be shortened. The VLIW processor 200 may determine whether the corresponding cycle may be shortened based on the VLIW instruction of the cycle having the shortening possibility and an operand of the corresponding instruction.

If it is determined that the cycle having the shortening possibility may be shortened, the VLIW processor 200 may shorten the corresponding cycle to process the compiled data.

The compiled data may not include the information on the cycle having the shortening possibility. In this case, the VLIW processor 200 may determine whether there is a shortening possibility of some cycles in the compiled data. A method for determining the shortening possibility by the VLIW processor 200 may be the same as the method for determining the shortening possibility by the electronic apparatus 100 described above.

When there is the shortening possibility of some cycles, the VLIW processor 200 may determine whether the corresponding cycle is shortened based on the VLIW instruction of the corresponding cycle and an operand of the corresponding instruction.

Since the VLIW processor 200 can shorten some cycles to process the compiled data, processing speed may be improved.

The electronic apparatus 100 or the VLIW processor 200 may determine the shortening possibility of some cycles in the compiled data. The electronic apparatus 100 can determine if there is a shortening possibility of some cycles in the compiled data, as will be described as Embodiment 1. The VLIW processor 200 can determine if there is a shortening possibility of some cycles in the compiled data, as will be described as Embodiment 2.

Figure 2:
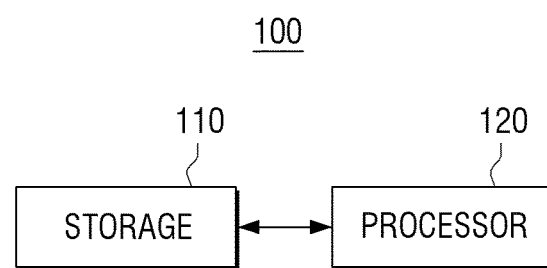
FIG. 2 is a block diagram of an electronic apparatus, according to an embodiment of the present disclosure.

Embodiment 1—Case in which Electronic Apparatus 100 Determines a Shortening Possibility of Some Cycles in Compiled Data FIG. 2 is a block diagram of the electronic apparatus 100, according to an embodiment of the present disclosure.

As illustrated in FIG. 2, the electronic apparatus 100 includes a storage 110 and a processor 120.

The storage 110 may store the compiled data in which the plurality of VLIW instructions are compiled. The compiled data, which is data used in the VLIW processor 200 including the plurality of function units, may be output after being compiled by the processor 120. Alternatively, the compiled data may also be data that is received from a device other than the electronic apparatus 100.

The storage 110 may store the method for determining the shortening possibility of some cycles in the compiled data. In addition, the storage 110 may store a method for including the information on the cycle having the shortening possibility in the compiled data.

The processor 120 may identify a predetermined VLIW instruction (e.g., a first) from the compiled data, and when a multi-cycle nop instruction for the plurality of functions is identified within a cycle corresponding to a latency of the VLIW instruction and an end cycle of the other VLIW instruction is within the cycle corresponding to the latency of the VLIW instruction, the processor 120 may include information on a cycle difference between an end cycle of the VLIW instruction and the end cycle of the another VLIW instruction (e.g., a second) in the multi-cycle nop instruction to update the compiled data. The other VLIW instruction may be a VLIW instruction which is processed in the function unit different from the predetermined VLIW instruction.

Figure 3A:
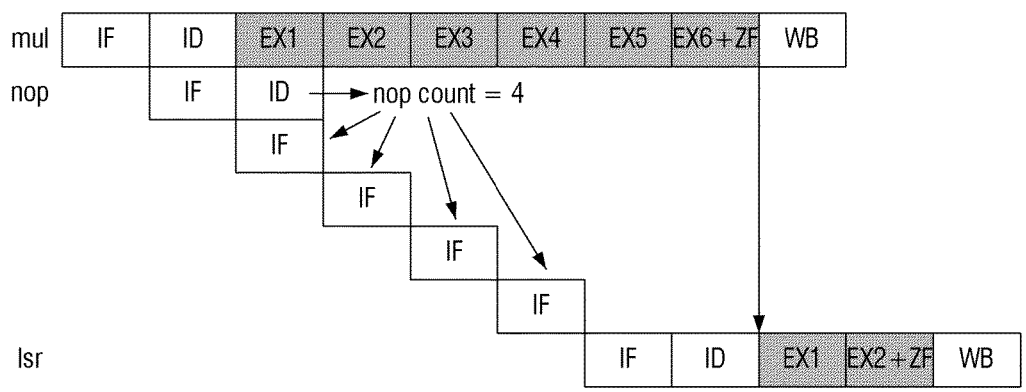
FIGS. 3A and 3B are diagrams of a function unit, according to an embodiment of the present disclosure.
Figure 3B:
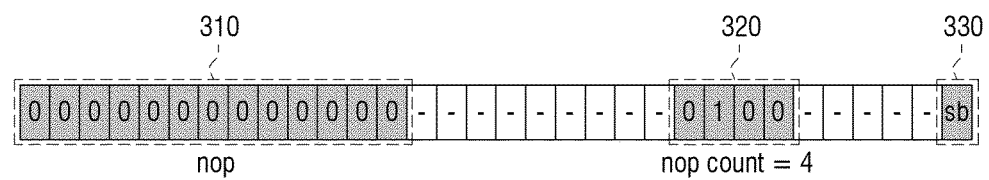

FIGS. 3A and 3B are diagrams of a function unit, according to an embodiment of the present disclosure.

FIG. 3A is a diagram of a mul instruction, a nop instruction, and a logical shift right (lsr) instruction that are sequentially input from one function unit.

First, an instruction fetch (IF) for the mul instruction is performed. In addition, an instruction decode (ID) for the mul instruction is performed to determine the kind of instruction, an address of an operand of the corresponding instruction, and the like. In addition, the mul instruction is operated (EX(EXEcute)1 to EX6+ZF(ZeroForwarding)). If the operation is completed, a result value is output (WB (Write Back)).

Since one function unit may not perform another operation while performing one operation, it may not perform another operation during the operations of the mul instruction (EX1 to EX6+ZF). Accordingly, the instruction fetch and the instruction decode for the lsr instruction are performed so that the lsr instruction is operated immediately if the operation of the mul instruction is completed. That is, a cycle that the instruction decode of the lsr instruction is performed and a cycle that the operation of the mul instruction is completed may be the same as each other.

In addition, the instruction fetch of the lsr instruction is performed after 6 cycles from the instruction fetch of the mul instruction. Accordingly, the nop instruction is used so that an instruction fetch thereof is not performed between the cycle that the instruction fetch of the mul instruction is performed and the cycle that the instruction fetch of the lsr instruction is performed.

The nop instruction includes a nop count, and when the nop count is 0, the instruction fetch is not performed during one cycle. Since the instruction fetch should not be performed during 5 cycles, the above-mentioned case further needs 4 cycles that the instruction fetch is not performed than the case in which the nop count is 0. Accordingly, in this case, the nop count becomes 4.

That is, the nop instruction means an instruction that prevents the instruction fetch during at least one cycle, and the nop instruction that the nop count is not 0 is the same concept as the multi-cycle nop instruction. Hereinafter, the nop instruction that the nop count is not 0 and the multi-cycle nop instruction are used interchangeably.

A nops instruction that the nop instructions for the plurality of function units are combined may also be used. For example, the nops instruction that the nop instructions for four function units are combined may be an instruction that prevents the instruction fetch during a plurality of cycles for all of the four function units. The nop count may be the same for all of the four function units. The nops instruction will be additionally described with reference to FIG. 3B.

FIG. 3B is a diagram of an operation (OP) code of the nop instruction.

The OP code of the nop instruction consists of 32 bits, and includes identification information 310, nop count information 320, and a stop bit (sb) 330.

The identification information 310 is information for recognizing the nop instruction in the OP code, and the nop count information 320 may include information about whether the instruction fetch is not additionally performed during few cycles. In FIG. 3B, the nop count is 4.

The stop bit 330 may be used when there are a plurality of function units. As described above, FIGS. 3A and 3B are diagrams for one function unit. However, the VLIW processor 200 may include the plurality of function units, and if the stop bit 330 is a predetermined value, the instruction fetch may not be performed for the remaining function units of the same cycle.

If the stop bit 330 is a predetermined value in the nop instruction of a second function unit of the plurality of function units, the instruction fetch may not be performed for the remaining function units of the same cycle. If the stop bit 330 is a predetermined value in the nop instruction of a second function unit of the plurality of function units, the instruction fetch may not be performed for a third function unit and a fourth function unit of the same cycle.

If the stop bit 330 is predetermined in the nop instruction of a first function unit of the plurality of function units, the instruction fetch may not be performed for the remaining function units of the same cycle. That is, the nops instruction may be the nop instruction that the stop bit is the predetermined value for the first function unit. For example, if the nops instruction is scheduled in the first function unit of the four function units, the instruction fetch may not be performed for the second function unit, the third function unit, and fourth function unit of the same cycle.

Sections denoted by '–' except for the identification information 310, the nop count information 320, and the stop bit 330 of FIG. 3B are sections which are not recognized, and may be input with 0 or 1. In addition, the identification information 310, the nop count information 320, and the stop bit 330 of FIG. 3B may also be changed to different positions.

Figure 4:
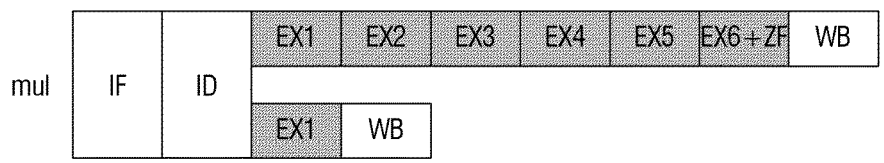
FIG. 4 is a diagram of a cycle that may be shortened in an operation of a mul instruction, according to an embodiment of the present disclosure.

FIG. 4 is a diagram of a cycle that may be shortened in an operation of a mul instruction, according to an embodiment of the present disclosure.

First, a first row of FIG. 4 illustrates a general operation of the mul instruction as described above. When a value of one of operands of the mul instruction is 0, the operation result of the mul instruction is 0. That is, if 0 is output immediately without using all of the cycles of EX1 to EX6+ZF to operate the mul instruction, the processing speed may be improved.

Specifically, a second row of the FIG. 4 illustrates that the cycles of EX2 to EX6+ZF may be shortened by using the cycle of EX1 to operate the mul instruction, and outputting immediately 0. In order to use the cycles shortened in this method, a method for changing the nop count of the nop instruction may be used.

The above-mentioned method may be applied to a div instruction, a sqrt instruction, an exp instruction, a log instruction, and the like, as well as the mul instruction. The div instruction may output 0 if a divided operand is 0, the sqrt instruction may output 1 if an operation is 1, the exp instruction may output 1 if an exponent is 0, and the log instruction may output 0 if an operand is 1. However, the instructions may include all VLIW instruction of which the result value is determined as one value according to the operand without performing the operation among the VLIW instruction.

FIGS. 3A to 4 illustrate a case in which one function unit is used, but when a plurality of function units are used, the cycle can be shortened in consideration of the kind of VLIW instructions of peripheral function units.

Figure 5A:
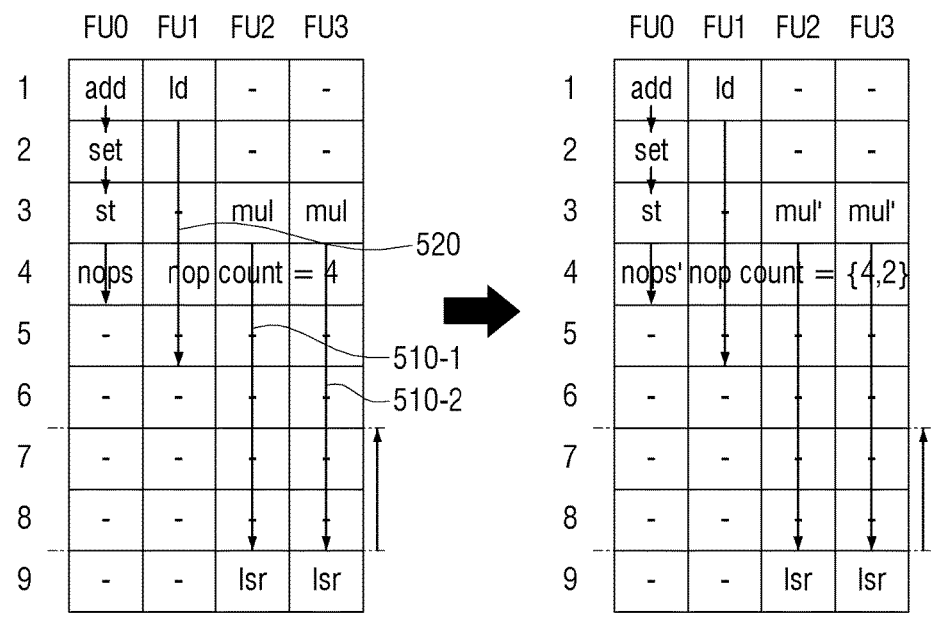
Figure 5C:
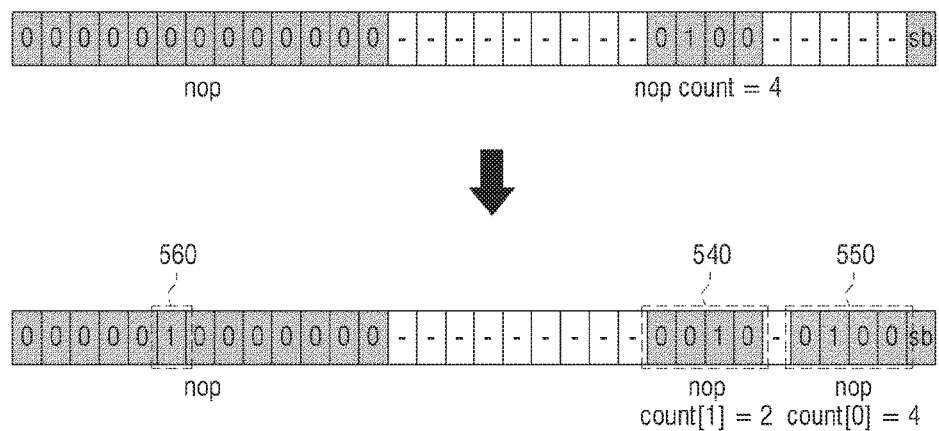

FIGS. 5A to 5C are diagrams of a method for shortening some cycles when there are a plurality of function units, according to an embodiment of the present disclosure.

First, the processor 120 may identify a predetermined VLIW instruction in a left compiled data of FIG. 5A. For example, the processor 120 may identify the mul instruction in a third cycle.

In addition, the processor 120 may identify the multi-cycle nop instruction for the plurality of function units within the cycles corresponding to latencies 510-1 and 510-2 of the identified VLIW instruction. The multi-cycle nop instruction for the plurality of function units may be the multi-cycle nop instruction for all of the plurality of function units. In FIG. 5A, the multi-cycle nop instruction is represented as the nop instruction of nop count 4, which means that the instruction fetch is not performed during 5 cycles for all of the four function units.

However, the respective nop counts of the multi-cycle nop instruction can be different. This will be described with reference to FIG. 5B, and a case in which the respective counts of the multi-cycle nop instruction for the plurality of function units are the same will be described first.

The nops instruction may be the VLIW instruction processed in the first function unit of the plurality of function units. That is, the processor 120 may identify a predetermined VLIW instruction for one of the plurality of function units, and may also identify only the nops instruction for the first function unit within the cycle corresponding to the latency of the identified VLIW instruction.

In addition, if an end cycle of the other VLIW instruction is within the cycles corresponding to the latencies 510-1 and 510-2 of the VLIW instruction, the processor 120 may include information on a cycle difference between the end cycle of the VLIW instruction and the end cycle of the other VLIW instruction in the multi-cycle nop instruction to update the compiled data.

The other VLIW instruction may be an instruction included in the cycle in which the VLIW instruction is included or a previous cycle thereof. For example, the other VLIW instruction may be an instruction included in a cycle in which the mul instruction is included just like an st instruction of the third cycle, or an instruction included in a previous cycle of the cycle in which the mul instruction is included just like an add instruction and ld instruction of the first cycle.

If the last end cycle among the end cycles of the other VLIW instruction is within the cycles corresponding to the latencies 510-1 and 510-2 of the VLIW instruction, the processor 120 may include information on a cycle difference between the end cycle of the VLIW instruction and the last end cycle in the multi-cycle nop instruction.

For example, in FIG. 5A, the last end cycle of the other VLIW instruction is a sixth cycle by the latency 520 of the ld instruction, and the processor 120 may include 2 cycles, which is a difference between the end cycle of the mul instruction and the end cycle of the ld instruction, in the multi-cycle nop instruction.

Since the electronic apparatus 100 does not have information on the operand, the electronic apparatus 100 does not directly shorten the cycle, and may include only a cycle difference in the multi-cycle nop instruction. The cycle difference is identified by the VLIW processor 200, and the VLIW processor 200 may determine whether to shorten the cycle as much as the identified cycle difference based on the operand, which will be described in greater detail below.

When at least one VLIW instruction is not identified in the cycles between the end cycle of the other VLIW instruction and the end cycle of the VLIW instruction, the processor 120 may include the information on the cycle difference in the multi-cycle nop instruction to update the compiled data.

As illustrated in FIG. 5B, when the respective nop counts of the multi-cycle nop instruction for the plurality of function units are different, at least one VLIW instruction may be identified in the cycles between the end cycle of the other VLIW instruction and the end cycle of the VLIW, and if the cycle is shortened as much as the cycle difference between the end cycle of the VLIW instruction and the end cycle of the other VLIW instruction, the add instruction 530 of an eighth cycle may not be operated.

Therefore, the processor 120 may determine that there is a possibility of shortening the cycle only in the case in which at least one VLIW instruction is not identified in the cycles between the end cycle of the other VLIW instruction and the end cycle of the VLIW instruction.

The processor 120 may count the number of cycles corresponding to the cycle difference between the end cycle of the VLIW instruction and the end cycle of the other VLIW instruction, and may include the count value in the OP code of the multi-cycle nop instruction of the compiled data to update the compiled data.

For example, in FIG. 5A, the cycle difference is 2, and 2 may be added to the OP code to update the compiled data. The information on the cycle difference may be added to some of sections denoted by '−' in the OP code, and the VLIW processor 200 may identify the corresponding information to identify that there is a shortening possibility of the cycle.

Alternatively, as illustrated in FIG. 5C, the processor 120 may include information in the OP code to update the compiled data. Since the cycle may not be shortened if the operand of the mul instruction is not 0 in the example of FIG. 5A, the nop count is 4. Alternatively, if the operand of the mul instruction is 0, two cycles may be shortened, and the nop count is 2 which is shortened as much as 2 cycles from the nop count 4 when the cycle may not be shortened.

That is, the processor 120 may include information on a first nop count 540 of [1] in which the cycle may be shortened and information on a second nop count 550 of [0] in which the cycle may not be shortened in the OP code to update the compiled data.

The VLIW processor 200 may determine whether the cycle may be shortened based on the operand of the mul instruction, and may process the compiled data based on one of the information on the first nop count and the information on the second nop count.

The processor 120 may identify the predetermined VLIW instruction in the compiled data, and when the multi-cycle nop instruction is identified within the cycle corresponding to the latency of the VLIW instruction, the processor 120 may synchronize identification information of the VLIW instruction and identification information of the multi-cycle nop instruction included in the compiled date with each other and change the identification information.

For example, as illustrated in FIG. 5C, the processor 120 may change a sixth bit 560 among identification information of 13 bits of the nop instruction to change the identification information. In addition, although not illustrated in FIG. 5C, the processor 120 may change the identification information of the mul instruction by similar method.

The VLIW processor 200 may store information on a method for changing the identification information of the electronic apparatus 100, and may identify a plurality of instructions of which identification information is changed, based on the corresponding information.

Figure 6:
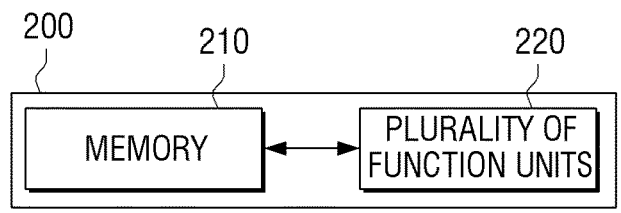
FIG. 6 is a block diagram of a VLIW processor, according to an embodiment of the present disclosure.

FIG. 6 is a block diagram of a configuration of a VLIW processor 200, according to an embodiment of the present disclosure.

As illustrated in FIG. 6, the VLIW processor 200 includes a memory 210 and a plurality of function units 220.

The memory 210 may store the compiled data, which may be input directly from the electronic apparatus 100, and may also be input through another apparatus. For example, the compiled data may also be input through an external memory to the VLIW processor 200.

The compiled data may include information on the shortening possibility of some cycles and information on a set of instructions which may be shortened.

The memory 210 may be a cache memory, a register file, and/or a buffer provided in the VLIW processor 200.

The plurality of function units may process the compiled data, and the VLIW processor 200 may include four function units, or any number of function units.

The VLIW processor 200 may sequentially execute at least one VLIW instruction based on the compiled data, and when the VLIW instruction being executed is the predetermined VLIW instruction, the operand of the VLIW instruction has a predetermined value, and the multi-cycle nop instruction synchronized with the VLIW instruction is identified within the cycle corresponding to the latency of the VLIW instruction, the VLIW processor 200 may shorten the cycle of the multi-cycle nop instruction based on the information included in the multi-cycle nop instruction to process the compiled data.

For example, when the updated compiled data is processed as illustrated in FIG. 5C, the VLIW processor 200 may shorten the cycle based on information on the first nop count 540 if the operand of the VLIW instruction has the predetermined value, and may not shorten the cycle based on information on the second nop count 550 if the operand of the VLIW instruction does not have the predetermined value.

When a plurality of multi-cycle nop instructions synchronized with the VLIW instruction are identified within the cycle corresponding to the latency of the VLIW instruction, the VLIW processor 200 may shorten the cycle of the multi-cycle nop instruction having a minimum cycle difference based on information included in the multi-cycle nop instruction having the minimum cycle difference with the VLIW instruction to process the compiled data.

Figure 7:
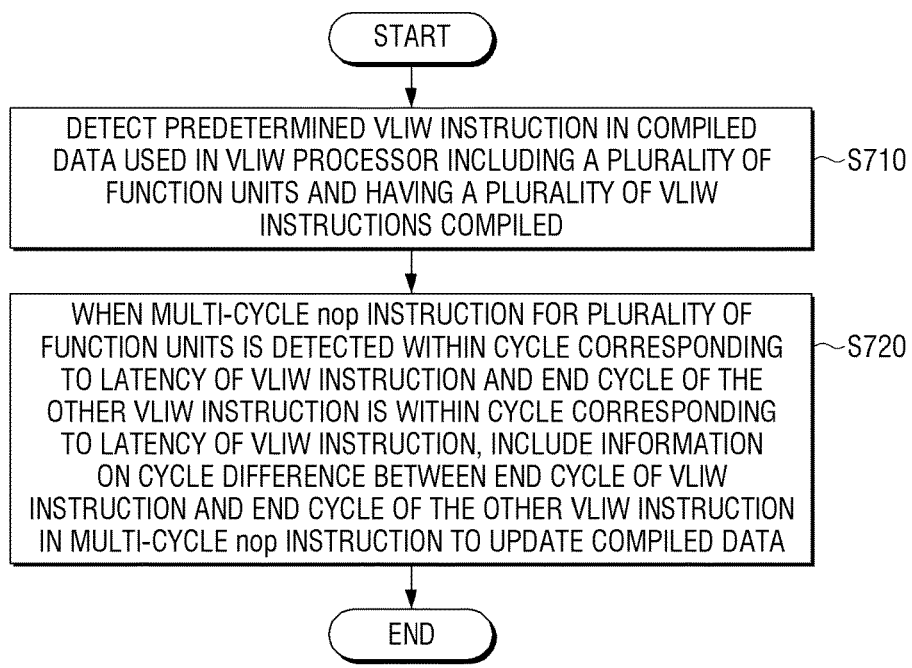
FIG. 7 is a flowchart of a control of a method of an electronic apparatus, according to an embodiment of the present disclosure.

FIG. 7 is a flowchart of a control method of an electronic apparatus, according to an embodiment of the present disclosure.

A predetermined VLIW instruction can first be identified in compiled data used in a VLIW processor including a plurality of function units and having a plurality of VLIW instructions compiled is identified at step S710. In addition, if a multi-cycle nop instruction for the plurality of function units is identified within a cycle corresponding to a latency of the VLIW instruction, and an end cycle of the other VLIW instruction is within the cycle corresponding to the latency of the VLIW instruction, information on a cycle difference between an end cycle of the VLIW instruction and the end cycle of the other VLIW instruction is included in the multi-cycle nop instruction to update the compiled data at step S720.

The other VLIW instruction may be an instruction included in the cycle in which the VLIW instruction is included or a previous cycle thereof.

In the updating step S720, identification information of the VLIW instruction and identification information of the multi-cycle nop instruction included in the compiled data are synchronized with each other to change the identification information.

In the updating step S720, the number of cycle corresponding to the cycle difference between the end cycle of the VLIW instruction and the end cycle of the other VLIW instruction may be counted, and the count value may be included in an OP code of the multi-cycle nop instruction of the compiled data to update the compiled data.

In the updating step S720, when at least one VLIW instruction is not identified in cycles between the end cycle of the other VLIW instruction and the end cycle of the VLIW instruction, the information on the cycle difference may be included in the multi-cycle nop instruction to update the compiled data.

Figure 8:
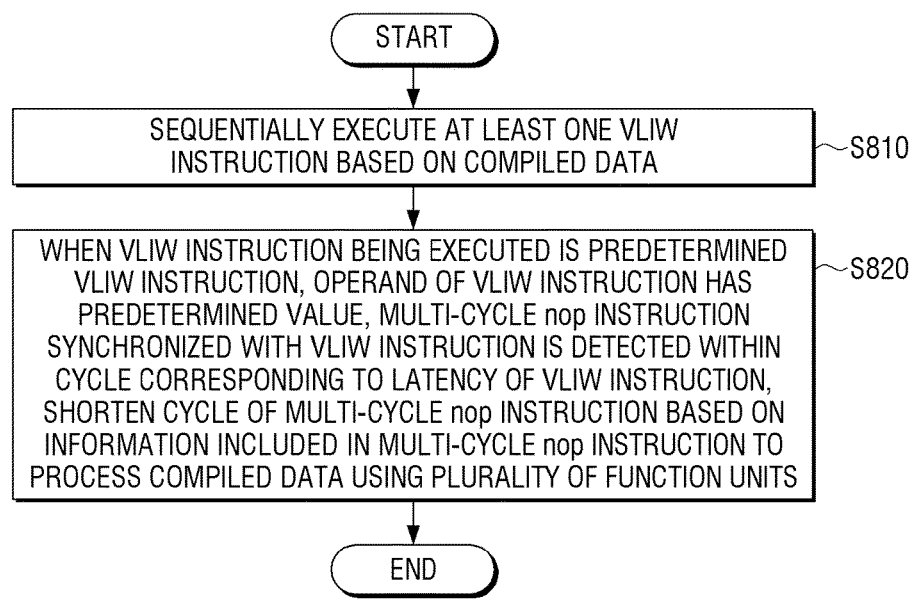
FIG. 8 is a flowchart of a control of a method of a VLIW processor, according to an embodiment of the present disclosure.

FIG. 8 is a flowchart of a control method of a VLIW processor, according to an embodiment of the present disclosure.

At least one VLIW instruction can first be sequentially executed based on the compiled data at step S810. If the VLIW instruction being executed is the predetermined VLIW instruction, an operand of the VLIW instruction has a predetermined value, and the multi-cycle nop instruction synchronized with the VLIW instruction is identified within the cycle a latency of the VLIW instruction, the cycle of the multi-cycle nop instruction is shortened based on information included in the multi-cycle nop instruction to process the compiled data using the plurality of function units at step S820.

In the processing step S820, when a plurality of multi-cycle nop instructions synchronized with the VLIW instruction are identified within the cycle corresponding to the latency of the VLIW instruction, the cycle of the multi-cycle nop instruction having a minimum cycle difference may be shortened based on information included in the multi-cycle nop instruction having the minimum cycle difference with the VLIW instruction to process the compiled data using the plurality of function units.

Hereinabove, it has been described on how the electronic apparatus 100 can determine a shortening possibility of some cycles in the compiled data. Hereinafter, it will be described on how the VLIW processor 200 can determine a shortening possibility of some cycles during the execution of the compiled data.

Figure 9:
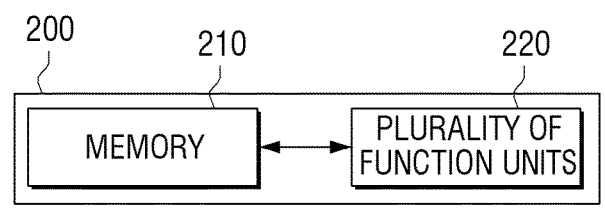
FIG. 9 is a block diagram of a VLIW processor, according to an embodiment of the present disclosure.

Embodiment 2—Case in which VLIW Processor 200 Determines a Shortening Possibility of Some Cycles During Execution of Compiled Data FIG. 9 is a block diagram of a VLIW processor 200, according to an embodiment of the present disclosure.

As illustrated in FIG. 9, the VLIW processor 200 includes a memory 210 and a plurality of function units 220. In FIGS. 6 and 9, the configuration of the VLIW processor 200 is the same, but the operations that they perform are different.

The memory 210 may store the compiled data. The compiled data may be input directly from the electronic apparatus 100, or may be input through another apparatus. For example, the compiled data may also be input through an external memory provided.

The compiled data does not include the information on the shortening possibility of some cycles and the information on the set of instruction which may be shortened, unlike Embodiment 1. That is, the compiled data may be data compiled by extracting the plurality of VLIW instructions from a program written in a high-level language.

The memory 210 may be a cache memory, a register file, and/or a buffer provided in the VLIW processor 200.

The plurality of function units 220 may process the compiled data, and the VLIW processor 200 may include four function units, or the VLIW processor 200 may include more or less function units.

The VLIW processor 200 may sequentially execute at least one VLIW instruction based on the compiled data. In addition, if the VLIW instruction being executed is the predetermined VLIW instruction and the operand of the VLIW instruction has the predetermined value, the VLIW processor 200 may change the latency of the VLIW instruction and may process the VLIW instruction during the changed latency.

If the VLIW instruction being executed is the mul instruction, and one of the operands of the mul instruction is 0, the VLIW processor 200 may shorten the latency of the mul instruction. That is, the VLIW processor 200 may directly shorten the latency of the VLIW instruction.

If a multi-cycle nop instruction for the plurality of function units is identified within a cycle corresponding to the latency of the VLIW instruction, and an end cycle of the other VLIW instruction which is currently being executed is within the cycle corresponding to the latency of the VLIW instruction, the VLIW processor 200 may shorten the cycle of the multi-cycle nop instruction based on a cycle difference between an end cycle of the VLIW instruction and the other VLIW cycle to process the compiled data.

That is, an operation of the VLIW processor 200 may be similar to the operation of the electronic apparatus 100 of Embodiment 1.

However, the VLIW processor 200 may also determine whether the operand of the predetermined VLIW instruction has the predetermined value. Since the VLIW processor 200 may access information on the operand, it may determine whether the predetermined cycles are shortened, not the shortening possibility of the predetermined cycles.

In Embodiment 1, since the electronic apparatus 100 does not have the information on the operand, it determines only the shortening possibility of the predetermined cycles, and does not determine whether the predetermined cycles are shortened. Also, the determination of whether the cycles are shortened is determined by the VLIW processor 200.

In addition, if the operand of the predetermined VLIW instruction has the predetermined value, the VLIW processor 200 may shorten the cycle of the multi-cycle nop instruction based on the cycle difference between the end cycle of the VLIW instruction and the other VLIW cycle.

In Embodiment 1, the electronic apparatus 100 does not process the compiled data, and therefore, may not shorten some of the cycles. That is, in Embodiment 1, the electronic apparatus 100 may include only information on the shortening possibility in the compiled data to assist in the operation of the VLIW processor 200.

A changed cycle of the latency of the VLIW instruction and a shortened cycle of the multi-cycle nop instruction may be different from each other. Even though the latency of the mul instruction is shortened as much as 5 cycles from 6 to 1, the shortened cycle of the multi-cycle nop instruction may be less than or equal to 5; this is because there may be dependency between the VLIW instructions processed by the plurality of function units 220.

Figure 10:
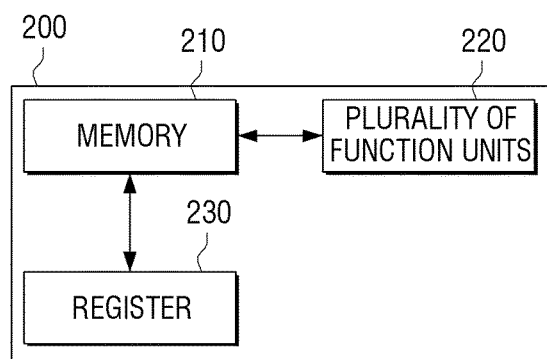
FIG. 10 is a block diagram of a VLIW processor, according to an embodiment of the present disclosure.

FIG. 10 is a block diagram of a VLIW processor 200, according to still an embodiment of the present disclosure.

As illustrated in FIG. 10, the VLIW processor 200 includes the memory 210, the plurality of function units 220, and the register 230, and a description for the components already described with respect to FIG. 9 will be omitted.

The VLIW processor 200 may further include the register 230, and the register 230 may be a small capacity data storage capable of temporarily storing data.

The VLIW processor 200 may store the information on the latency of the other VLIW instruction in the register 230. The other VLIW instruction may be the VLIW instruction having the most cycles remaining until the execution completion among the VLIW instructions which are being currently executed.

The information on the latency of the other VLIW instruction stored in the register 230 may include at least one of cycle identification information corresponding to the latency of the other VLIW instruction, and information on the number of cycles remaining until the execution completion of the other VLIW instruction based on a current cycle.

If the end cycle of the other VLIW instruction is within the cycle corresponding to the latency of the VLIW instruction based on the information stored in the register 230, the VLIW processor 200 may shorten the cycle of the multi-cycle nop instruction based on the cycle difference to process the compiled data.

In addition, when at least one VLIW instruction is not identified in the cycles between the end cycle of the other VLIW instruction and the end cycle of the VLIW instruction, the VLIW processor 200 may shorten the cycle of the multi-cycle nop instruction based on the information on the cycle difference to process the compiled data.

Figure 11:
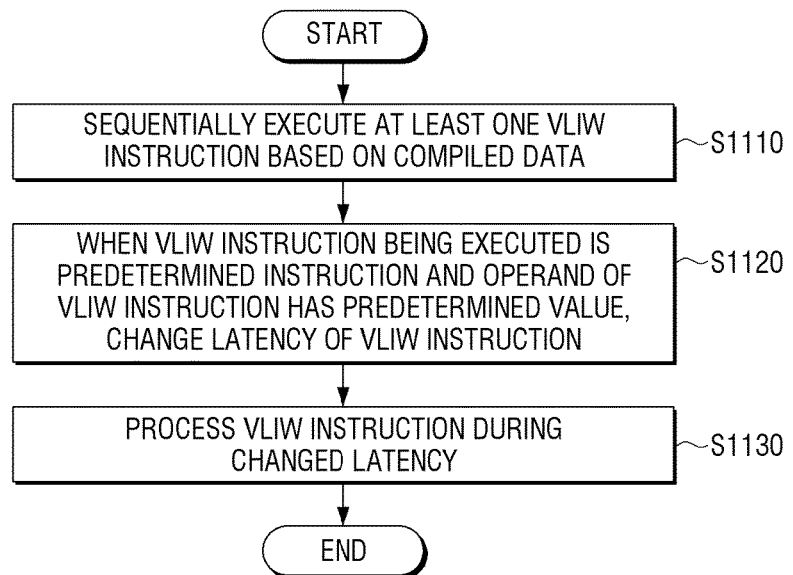
FIG. 11 is a flowchart of a control of a method of a VLIW processor, according to an embodiment of the present disclosure.

FIG. 11 is a flowchart of a control method of a VLIW processor, according to an embodiment of the present disclosure.

At least one VLIW instruction can first be sequentially executed based on the compiled data at step S1110. If the VLIW instruction being executed is the predetermined VLIW instruction, and the operand of the VLIW instruction has the predetermined value, the latency of the VLIW instruction is changed at step S1120. In addition, the VLIW instruction is processed during the changed latency at step S1130.

The method may further include, when the multi-cycle nop instruction for the plurality of function units is identified within the cycle corresponding to the latency of the VLIW instruction, and the end cycle of the other VLIW instruction which is being currently executed is within the cycle corresponding to the latency of the VLIW instruction, shortening the cycle of the multi-cycle nop instruction based on the cycle difference between the end cycle of the VLIW instruction and the other VLIW cycle to process the compiled data using the plurality of function units.

The other VLIW instruction is the VLIW instruction having the most cycles remaining until the execution completion among the VLIW instructions which are being currently executed. The method may also include storing information on a latency of the other VLIW instruction in the register included in the VLIW processor, e.g., during processing of the compiled data using the plurality of function units. If the end cycle of the other instruction is within the cycle corresponding to the latency of the VLIW instruction, based on the information stored in the register, the cycle of the multi-cycle nop instruction may be shortened based on the cycle difference to process the compiled data using the plurality of function units.

The information on the latency of the other VLIW instruction stored in the register may include at least one of cycle identification information corresponding to the latency of the other VLIW instruction, and information on the number of cycles remaining until the execution completion of the other VLIW instruction based on a current cycle.

When at least one VLIW instruction is not identified in the cycles between the end cycle of the other VLIW instruction and the end cycle of the VLIW instruction, the cycle of the multi-cycle nop instruction may be shortened based on the information on the cycle difference to process the compiled data, i.e., when the compiled data is being processed.

The VLIW processor may improve data processing speed by shortening some cycles of the compiled data in which the VLIW instruction is compiled.

The methods described above may be programmed and stored in a variety of storage mediums. Accordingly, the methods described herein may be implemented in various types of electronic devices that are capable of executing in one of the storage mediums.

Specifically, a non-transitory computer readable medium in which a program for sequentially performing the control method described above is stored may be provided.

The non-transitory computer readable medium is not limited to a medium that permanently stores data therein, e.g., a register, a cache, a memory, or the like, but can be a medium that semi-permanently stores data therein and is readable by a device. Specifically, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or other suitable storage mediums.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic apparatus generating compiled data used in a very long instruction word (VLIW) processor including a plurality of function units, the electronic apparatus comprising:
   a storage; and
   a processor configured to:
      control the storage to store the compiled data in which a plurality of VLIW instructions are compiled,
      identify a VLIW instruction from the compiled data, and
      update, if a multi-cycle no operation (nop) instruction for the plurality of function units is identified within a cycle corresponding to a latency of the identified VLIW instruction and if an end cycle of another VLIW instruction is within the cycle corresponding to the latency of the identified VLIW instruction, the compiled data by including information on a cycle difference between an end cycle of the identified VLIW instruction and the end cycle of the another VLIW instruction in the multi-cycle nop instruction.

2. The electronic apparatus as claimed in claim 1, wherein the another VLIW instruction is an instruction included a cycle in which the identified VLIW instruction is included or a previous cycle thereof.

3. The electronic apparatus as claimed in claim 1, wherein the processor synchronizes, if the multi-cycle nop instruction is identified within the cycle corresponding to the latency of the identified VLIW instruction, identification information of the identified VLIW instruction and identification information of the multi-cycle nop instruction included in the compiled data.

4. The electronic apparatus as claimed in claim 1, wherein, when updating the compiled data, the processor counts a number of cycles corresponding to the cycle difference between the end cycle of the identified VLIW instruction and the end cycle of the another VLIW instruction and includes the counted value in an operation (OP) code of the multi-cycle nop instruction of the compiled data.

5. The electronic apparatus as claimed in claim 1, wherein the processor updates, if at least one VLIW instruction is not identified in the cycles between the end cycle of the another VLIW instruction and the end cycle of the identified VLIW instruction, the compiled data by including the information on the cycle difference in the multi-cycle nop instruction.

6. A very long instruction word (VLIW) processor, comprising:
   a memory; and
   a plurality of function units,
   wherein the VLIW processor is configured to:
      control the memory to store compiled data,
      control the plurality of function units to process the compiled data,
      sequentially execute at least one VLIW instruction based on the compiled data and
      shorten, if the at least one VLIW instruction being executed is a predetermined instruction, if an operand of the at least one VLIW instruction comprises a predetermined value, and if a multi-cycle no operation (nop) instruction synchronized with the at least one VLIW instruction is identified within a cycle corresponding to a latency of the at least one VLIW instruction, a cycle of the multi-cycle nop instruction based on information included in the multi-cycle nop instruction.

7. The VLIW processor as claimed in claim 6, wherein the VLIW processor shortens, if a plurality of multi-cycle nop instructions synchronized with the at least one VLIW instruction are identified within the cycle corresponding to the latency of the VLIW instruction, the cycle of the multi-cycle nop instruction with a minimum cycle difference based on information included in the multi-cycle nop instruction.

8. The VLIW processor as claimed in claim 6, wherein the VLIW processor is configured to:
   change the latency of the at least one VLIW instruction, if the at least one VLIW instruction being executed is the predetermined VLIW instruction and the operand of the at least one VLIW instruction comprises the predetermined value, and
   process the at least one VLIW instruction during the changed latency.

9. The VLIW processor as claimed in claim 8, wherein the VLIW processor shortens, if the multi-cycle no operation (nop) instruction for the plurality of function units is identified within the cycle corresponding to the latency of the at least one VLIW instruction and an end cycle of another VLIW instruction which is being currently executed is within the cycle corresponding to the latency of the at least one VLIW instruction, a cycle of the multi-cycle nop instruction based on a cycle difference between the end cycle of the at least one VLIW instruction and the another VLIW cycle.

10. The VLIW processor as claimed in claim 9, further comprising a register,
    wherein the another VLIW instruction comprises the most cycles remaining until an execution completion among VLIW instructions which are being currently executed, and
    the VLIW processor configured to:
    store information on the latency of the another VLIW instruction in the register, and
    shorten, if the end cycle of the another VLIW instruction is within the cycle corresponding to the latency of the at least one VLIW instruction based on the information stored in the register, the cycle of the multi-cycle nop instruction based on the cycle difference.

11. The VLIW processor as claimed in claim 10, wherein the information on the latency of the another VLIW instruction stored in the register includes at least one of cycle identification information corresponding to the latency of the another VLIW instruction and information on cycles remaining until an execution completion of the another VLIW instruction based on a current cycle.

12. The VLIW processor as claimed in claim 9, wherein the VLIW processor shortens, if at least one VLIW instruction is not identified in the cycles between the end cycle of the another VLIW instruction and the end cycle of the at least one VLIW instruction, the cycle of the multi-cycle nop instruction based on the information on the cycle difference.

13. A control method of a very long instruction word (VLIW) processor, the control method comprising:
    sequentially executing at least one VLIW instruction based on compiled data;
    changing a latency of the at least one VLIW instruction, if the at least one VLIW instruction being executed is a predetermined VLIW instruction and an operand of the at least one VLIW instruction comprises a predetermined value;
    processing the at least one VLIW instruction during the changed latency; and
    shortening, if a multi-cycle no operation (nop) instruction for the plurality of function units is identified within the cycle corresponding to the latency of the at least one VLIW instruction and an end cycle of another VLIW instruction which is being currently executed is within the cycle corresponding to the latency of the at least one VLIW instruction, a cycle of the multi-cycle nop instruction based on a cycle difference between the end cycle of the at least one VLIW instruction and the another VLIW cycle.

14. The control method as claimed in claim 13, wherein the VLIW processor comprises a register,
    wherein the another VLIW instruction comprises the most cycles remaining until an execution completion among VLIW instructions which are being currently executed, and
    further comprising:
    storing information on the latency of the another VLIW instruction in the register, and
    shortening, if the end cycle of the another VLIW instruction is within the cycle corresponding to the latency of the at least one VLIW instruction based on the information stored in the register, the cycle of the multi-cycle nop instruction based on the cycle difference.

15. The control method as claimed in claim 14, wherein the information on the latency of the another VLIW instruction stored in the register includes at least one of cycle identification information corresponding to the latency of the another VLIW instruction and information on cycles remaining until an execution completion of the another VLIW instruction based on a current cycle.

16. The control method as claimed in claim 13, further comprising:
    shortening, if at least one VLIW instruction is not identified in the cycles between the end cycle of the another VLIW instruction and the end cycle of the at least one VLIW instruction, the cycle of the multi-cycle nop instruction based on the information on the cycle difference.

* * * * *